UNITED STATES PATENT OFFICE 2,538,130

1-DIMETHYLAMINO-2-METHYL-3,3-DI-PHENYLHEXIMINE-4 AND PREPARATION THEREOF

Meyer Sletzinger, Forest Hills, N. Y., and Max Tishler, Rahway, N. J., assignors to Merck & Co., Inc., Rahway, N. J., a corporation of New Jersey No Drawing. Application June 21, 1947, Serial No. 756,320

4 Claims. (Cl. 260—566)

This invention relates to the preparation of certain new chemical compounds possessing analgesic and anesthetic action. More particularly, it relates to the preparation of the new chemical compound, isoamidone, 1 - dimethylamino - 2 - methyl-3,3-diphenyl hexanone-4, and its hydrohalide salts. The new products possess analgesic action, and may be used as a substitute for morphine.

The new therapeutic compound with which our invention is primarily concerned, 1-dimethylamino-2-methyl-3,3-diphenyl hexanone-4, having the structural formula:

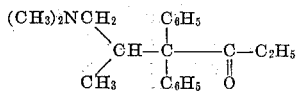

is related to the known analgesic and morphine substitute, Amidone. Amidone was developed in Germany during World War II, and is described in the Department of Commerce (Office of the Publication Board) Report OPB 981, dated July 1945. However, our new chemical compound, as well as its hydrohalide salts, possesses superior analgesic and pain-relieving action. It is less toxic than Amidone and appears to be more active in its therapeutic effects than the German product. As a substitute for morphine for surgical and medical use, it is more effective than Amidone. It appears to be much more promising than previously available morphine substitutes.

Our invention is also concerned with a new chemical compound, an intermediate produced in the process, herein disclosed, by which we may produce our new analgesic compounds and its salts. This new intermediate compound, useful for making our new therapeutic agents and for other purposes, may be chemically characterized as 1-dimethylamino-2-methyl-3,3 diphenyl heximine-4 (hereinafter sometimes referred to as the imino compound), which has the structural formula:

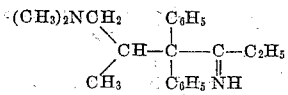

Our invention also includes the hydrohalide salts of this imino compound, especially the hydrobromide salt, which are also new chemical compounds useful for producing our new analgesic agent.

In producing our new analgesic compound, and the imine intermediate compound, we react 2,2-diphenyl-4, dimethylamino-isovaleronitrile with an ethyl magnesium Grignard reagent, such as ethyl magnesium bromide, and subsequently hydrolyze the resulting product to form the imino compound, 1-dimethylamino - 2 - methyl-3,3-diphenyl heximine-4. This imino compound is then refluxed with an inorganic acid, preferably with a hydrohalic acid such as hydrobromic acid, to form the desired 1-dimethylamino-2-methyl-3,3-diphenyl hexanone-4.

In carrying out the hydrolysis, the pH of the mixture is adjusted to a value between 5 and 7. While we have secured best results with ethyl magnesium bromide as the Grignard reagent, other ethyl magnesium halides may be utilized with equal success.

When carrying out the reaction with ethyl magnesium bromide as the Grignard reagent, we generally prefer to effect the hydrolysis with hydrobromic acid as the inorganic acid, but this step of our process may be carried out utilizing other inorganic acids as well.

The chemical reactions occurring may be indicated as follows:

A. Reaction with Grignard reagent and hydrolysis:

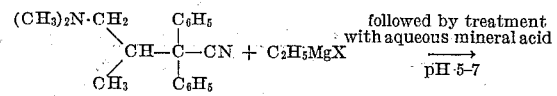

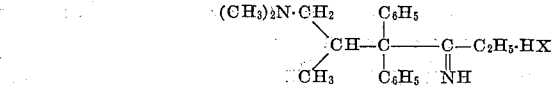

B. Conversion of imino compound to ketone:

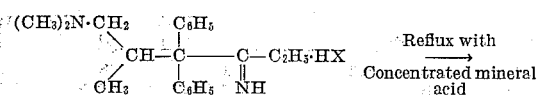

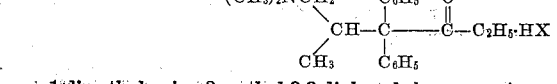

1-dimethylamino-2-methyl-3,3-diphenyl hexanone-4 hydrohalide

In these equations X represents a halogen, such as bromine, and HX a hydrohalide.

EXAMPLE 1

*Preparation of 1-dimethylamino-2-methyl-3,3-diphenyl-heximine-4*

Ethyl magnesium bromide Grignard reagents was prepared by adding to 108 grams of ethyl bromide 21.4 grams of magnesium turnings, suspended in 240 milliliters of anhydrous ether, contained in a one-liter three-necked flask equipped with stirrer, dropping funnel, thermometer, and reflux condenser. The reaction was initiated by adding 100 mgs. of iodine and 5 mls. of ethyl bromide to the mixture. After about an hour, at the end of which period the reactants had been brought together in total amount, the solution was refluxed for an additional period of one hour in order to complete the reaction. At this stage of the preparation, 40 milliliters of dry xylene was added, and part of the ether was distilled off, until the temperature in the reaction vessel reached 75° C. 96 grams of 2,2-diphenyl-4-dimethylamino-isovaleronitrile of melting point 58–63° C., dissolved in 146 mls. of xylene, was then added to the ethyl magnesium bromide, the addition being effected over a period of one hour. During this time the mixture was stirred. The temperature rose to 78° C. and, after all of the nitrile had been added, stirring and heating was continued for an additional period of two hours.

The hot mixture was then poured into a solution of 440 mls. of water and 200 mls. of aqueous hydrobromic acid (concentration 45.6%), with agitation. The mixture was stirred for one hour, cooled to room temperature, and the aqueous layer allowed to separate from the xylene layer.

The aqueous layer was removed from the reaction vessel and its pH adjusted to a value within the range 5 to 7 by the addition of aqueous ammonia. An oil settled out and this oil, after seeding and scratching, crystallized. The precipitate was recrystallized from a mixture of isopropyl alcohol and isopropyl ether. The compound obtained was 1-dimethylamino-2-methyl-3,3-diphenyl-heximine-4-hydrobromide.

The new compound was dried at a reduced pressure of 3 mm. of mercury, absolute, for ten hours at a temperature of 100° C. It was a crystalline product, having a melting point of 155–156° C.

Analysis: Calculated for $C_{21}H_{29}N_2Br$: C, 64.70; H, 7.51; N, 7.19; Br, 20.53.
Found: C, 64.70; H, 7.7; N, 7.09; Br, 20.7.

EXAMPLE 2

*Preparation of 1-dimethylamino-2-methyl-3,3-diphenyl-hexanone-4 hydrobromide*

5.0 grams of the 1-dimethylamino-2-methyl-3,3-diphenyl-heximine-4, prepared as in Example 1, was dissolved in 25 mls. of concentrated hydrobromic acid and refluxed for 8 hours. At the end of this time an oil separated. After cooling and dilution by the addition of 25 mls. of water, the mixture was stirred and scratched. Crystals of the hydrobromide of 1-dimethylamino-2-methyl-3,3-diphenyl hexanone-4 were formed. After drying the product at 50° C. for 10 hours at an absolute pressure of 3 mm. of mercury, the white crystalline product had a melting point of 150.5–152° C.

Analysis: Calculated for $C_{21}H_{28}ONBr \cdot \tfrac{3}{4}H_2O$: N, 3.59.
Found. N, 3.57.

EXAMPLE 3

*Preparation of 1-dimethylamino-2-methyl-3,3-diphenyl-hexanone-4 hydrobromide*

Ethyl magnesium bromide Grignard reagent was prepared by adding 108 grams of ethyl bromide to 21.4 grams of magnesium turnings suspended in 240 mls. of anhydrous ether. The preparation was carried out in a one-liter, three-necked flask equipped with a stirrer, a dropping funnel, a thermometer, and reflux condenser.

The reaction was initiated by the addition of 100 milligrams of iodine and 5 mls. of ethyl bromide. Addition of the ethyl bromide to the magnesium turnings in the flask was complete in about one hour, and the solution was then refluxed for an additional period of one hour in order to complete the reaction. 40 mls. of xylene was then added, and some of the ether was distilled off until the temperature of the reaction mixture reached 75° C.

96 grams of 2-diphenyl-4-dimethylamino isovaleronitrile of melting point 66–67° C., dissolved in 146 mls. of xylene, was then added to the flask over a period of one hour, with stirring. The temperature during this stage of the reaction was 75–78° C. After all of the nitrile had been added, heating and stirring were continued for an additional period of 2 hours, the temperature remaining during this time within the range 75–78° C.

A white precipitate settled out when the reaction mixture was allowed to stand. The hot reaction mixture, at a temperature of 76° C., was then poured into a mixture of 440 mls. of water and 200 mls. of hydrobromic acid of 45.6% HBr concentration. The mixture was thoroughly agitated. A vigorous reaction set in, as a result of which some of the xylene was distilled off. The mixture was stirred for one hour and then allowed to stand over night.

The next day the lower water layer was separated, and 100 mls. of concentrated hydrobromic acid (45.6% concentration) added. The entire solution was then refluxed for 10 hours, at the end of which time a brown insoluble oil separated above the aqueous layer.

Crystallization of this oil was induced by cooling and stirring. The crystals were filtered off, washed with water, and the compound then recrystallized from 700 mls. of hot water using 10 grams of "Darco G–60" decolorizing carbon in order to effect decolorization. Upon cooling, crystals of the hydrobromide salt of 1-dimethylamino-2-methyl-3,3-diphenyl-hexanone-4 resulted. The yield was 96 grams (approximately 72%). After filtering the crystalline product off and washing it with cold water, a sample was dried at 100° C. under a pressure of 3 mm. of mercury absolute for a period of 10 hours. The white crystalline product had a melting point of 148–149.5° C.

Analyses confirmed the empirical formula to be $C_{21}H_{28}NOBr \cdot \tfrac{3}{4}H_2O$.

Analysis: Calculated for C, 62.60; H, 7.3; N, 3.4.
Found: C, 62.60; H, 7.50; N, 3.57.

EXAMPLE 4

*Preparation of 1-dimethylamino-2-methyl-3,3-diphenyl-hexanone-4 picrate*

2 grams of the hydrobromide salt of 1-dimethylamino-2-methyl-3,3-diphenyl-hexanone-4 prepared as in Example 3 was dissolved in 25 mls. of ethyl alcohol. To the resulting solution 3 grams of picric acid in 25 mls. of ethyl alcohol was added.

As the reaction mixture cooled, a yellow precipitate separated. The mixture was then further cooled, and the yellow crystalline product filtered off. This product was then recrystallized twice from ethyl alcohol. The crystalline material, which was the desired picrate salt, had a melting point of 151.5–152.5° C., after having been dried at 100° C. for twelve hours at an absolute pressure of 3 mm. of mercury.

Analyses: Calculated for $C_{27}H_{30}O_8N_4$; C, 60.22; H, 5.57; N, 10.41.
Found: C, 60.52; H, 5.81; N, 10.76.

EXAMPLE 5

*Preparation of 1-dimethylamino-2-methyl-3,3-diphenyl-hexanone-4 hydrochloride*

15 grams of the hydrobromide salt of 1-dimethylamino - 2 - methyl - 3,3 - diphenyl-hexanone-4, melting point 144–146° C., prepared as in Example 2, was dissolved in 80 mls. of hot water having a temperature of 70° C. Sodium hydroxide solution of 30% NaOH concentration was then added in an amount sufficient to render the solution definitely alkaline in reaction.

An oil separated from the aqueous phase, and the solution was then extracted three times by treatment each time with 30 mls. of chloroform. The extract was dried over potassium carbonate, and filtered.

The resulting clear solution was evaporated on a steam bath under a water aspirator, yielding a yellowish oil, which was isoamidone base (1-dimethylamino-2-methyl - 3,3 - diphenyl hexanone-4). This oil was then dissolved in 10 mls. of isopropanol to which 10 mls. of a solution of 4.9 N hydrogen chloride in isopropanol had been added. The solution was thus acidified, and isopropyl ether was added until it became turbid.

After cooling to room temperature, the crystalline hydrochloride of 1-dimethylamino-2-methyl-3,3-diphenyl-hexanone-4 crystallized out. The product was dried at reduced pressure for 10 hours at 100° C. (at an absolute pressure of 10 mm. of mercury). The yield was 6.2 grams of crystalline product, having a melting point of 198.5–200.5° C.

An additional amount of the desired salt was obtained by adding excess isopropyl ether to the mother liquor, followed by cooling and filtering. The additional yield secured in this way was 2.0 grams.

Analyses: Calculated for $C_{21}H_{28}NOCl$; C, 72.90; H, 8.16; N, 4.05; Cl, 10.25.
Found: C, 73.09; H, 8.10; N, 4.18; Cl, 10.12.

Various changes and modifications may be made in our invention, certain preferred embodiments of which are herein described, without departing from the scope thereof. It is our intention that such changes and modifications, to the extent that they are within the scope of the appended claims, will be construed as part of our invention.

We claim:
1. 1-dimethylamino-2-methyl - 3,3 - diphenyl-heximine-4.
2. The process of preparing 1-dimethylamino-2-methyl-3,3-diphenyl-heximine-4 which comprises reacting 2,2-diphenyl-4-dimethylamino-isovaleronitrile with a lower alkyl magnesium halide and hydrolyzing with aqueous hydrohalic acid.
3. The process of preparing 1-dimethylamino-2-methyl-3,3-diphenyl-heximine-4 which comprises reacting 2,2-diphenyl-4-dimethylamino-isovaleronitrile with ethyl magnesium bromide, hydrolyzing with aqueous hydrobromic acid and adjusting the pH of the resulting reaction mixture to a pH within the range 5 to 7 by the addition of aqueous ammonia.
4. A compound selected from the group which consists of 1 - dimethylamino - 2 - methyl-3,3-diphenylheximine-4 and hydrohalic salts thereof.

MEYER SLETZINGER.
M. TISHLER.

REFERENCES CITED

The following references are of record in the file of this patent:

Sidgwick: "Organic Chemistry of Nitrogen" (1937), pp. 313 and 314.

Houben: "Die Methoden der Organische Chemie," vol. 3, p. 589, 3rd ed., 1943.

Kleiderer et al.: Report 981—Office of the Publication Board, Dept. of Commerce, dated July 1945, pp. 85, 86, 96, 97, 96A (correction dated October 1, 1945).

Federation Proceedings, vol. 5, February 1946, p. 201.

Scott et al.: "J. Pharm. and Exptl. Therap.," vol. 87, May 1946 (read at meeting March 12, 1946), p. 63.

Blicke et al.: Paper 3K presented April 14 to 18, 1947, at the 111th meeting of the Am. Chem. Soc., Atlantic City, N. J.

Schultz et al.: "J. Am. Chem. Soc.," vol. 69, January 1947, pp. 188–189.

Schultz et al.: "J. Am. Chem. Soc.," vol. 69, October 1947, pp. 2454–2458.

Easton et al.: "J. Am. Chem. Soc.," vol. 69, April 1947, pp. 976–977.